United States Patent
Bouten

(10) Patent No.: US 9,010,659 B2
(45) Date of Patent: Apr. 21, 2015

(54) BOOM FORE AND AFT BREAKAWAY ASSEMBLY

(75) Inventor: Petrus Henricus Johannes Bouten, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 504 days.

(21) Appl. No.: 13/329,538

(22) Filed: Dec. 19, 2011

(65) Prior Publication Data
US 2012/0237284 A1    Sep. 20, 2012

Related U.S. Application Data

(60) Provisional application No. 61/424,703, filed on Dec. 20, 2010.

(51) Int. Cl.
*B05B 1/20*       (2006.01)
*F16D 1/00*       (2006.01)
*B25G 3/00*       (2006.01)
*F16G 11/10*      (2006.01)
*F16B 7/00*       (2006.01)
*F16C 11/00*      (2006.01)
*A01M 7/00*       (2006.01)

(52) U.S. Cl.
CPC .......... *A01M 7/0078* (2013.01); *A01M 7/0075* (2013.01); *A01M 7/0071* (2013.01)

(58) Field of Classification Search
CPC   A01M 7/0075; A01M 7/0078; A01M 7/0071
USPC ......... 239/167, 168, 169, 149, 162, 164, 166; 414/22.55, 676, 687; 403/353, 355, 403/383, 111–117, 122, DIG. 3
See application file for complete search history.

(56) References Cited

U.S. PATENT DOCUMENTS

| | | | |
|---|---|---|---|
| 2,548,209 A * | 4/1951 | Foster | 403/53 |
| 2,602,684 A | 7/1952 | Pinke | |
| 3,565,340 A | 2/1971 | Meinert et al. | |
| 3,972,476 A | 8/1976 | Hall | |
| 4,221,353 A * | 9/1980 | Kuhn et al. | 248/292.11 |
| 4,746,065 A * | 5/1988 | Gorder | 239/168 |
| 5,248,091 A * | 9/1993 | Thyberg | 239/168 |
| 5,957,383 A * | 9/1999 | Benest | 239/166 |
| 6,138,770 A | 10/2000 | Kayser | |
| 6,397,952 B1 * | 6/2002 | Hundeby | 172/126 |
| 6,889,915 B2 * | 5/2005 | Guesdon | 239/166 |
| 7,073,735 B2 | 7/2006 | Wubben et al. | |
| 7,740,190 B2 | 6/2010 | Peterson et al. | |
| 7,805,799 B2 * | 10/2010 | Reid et al. | 15/250.31 |
| 7,823,246 B2 * | 11/2010 | Reid et al. | 15/250.31 |
| 2002/0109016 A1 * | 8/2002 | Guesdon | 239/166 |

OTHER PUBLICATIONS

International Search Report for PCT/US2011/065763 dated May 23, 2012.

* cited by examiner

*Primary Examiner* — Len Tran
*Assistant Examiner* — Alexander Valvis

(57) ABSTRACT

A breakaway assembly may be provided. The breakaway assembly may comprise an upper joint connecting a boom tip to a structure (e.g. a plate.) The breakaway assembly may further comprise a first hinge connecting the boom tip to the structure and a second hinge connecting the boom tip to the structure. In addition, the breakaway assembly may comprise a pressure assembly connected to the boom tip and a lower joint connecting the pressure assembly to the structure. When a force is applied to the boom tip (e.g. from either side, fore or aft), the pressure assembly may be configured to oppose the force and one of the first hinge and the second hinge may be configured to release in response to the boom tip rotating.

13 Claims, 6 Drawing Sheets

BOOM FORE AND AFT BREAKAWAY ASSEMBLY

RELATED APPLICATION

Under provisions of 35 U.S.C. §119(e), Applicant claims the benefit of U.S. provisional application No. 61/424,703, filed Dec. 20, 2010, which is incorporated herein by reference.

BACKGROUND

A sprayer is a device used to spray a liquid. In agriculture, a sprayer is a piece of equipment that applies herbicides, pesticides, and fertilizers to agricultural crops. Sprayers range in size from man-portable units (typically backpacks with spray guns) to self-propelled units similar to tractors, with boom mounts typically of 60-151 feet in length, but smaller or taller booms are possible.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A breakaway assembly may be provided. The breakaway assembly may comprise an upper joint connecting a boom tip to a structure. The breakaway assembly may further comprise a first hinge connecting the boom tip to the structure and a second hinge connecting the boom tip to the structure. In addition, the breakaway assembly may comprise a pressure assembly connected to the boom tip and a lower joint connecting the pressure assembly to the structure. When a force is applied to the boom tip, the pressure assembly may be configured to oppose the force and one of the first hinge and the second hinge may be configured to release in response to the boom tip rotating.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
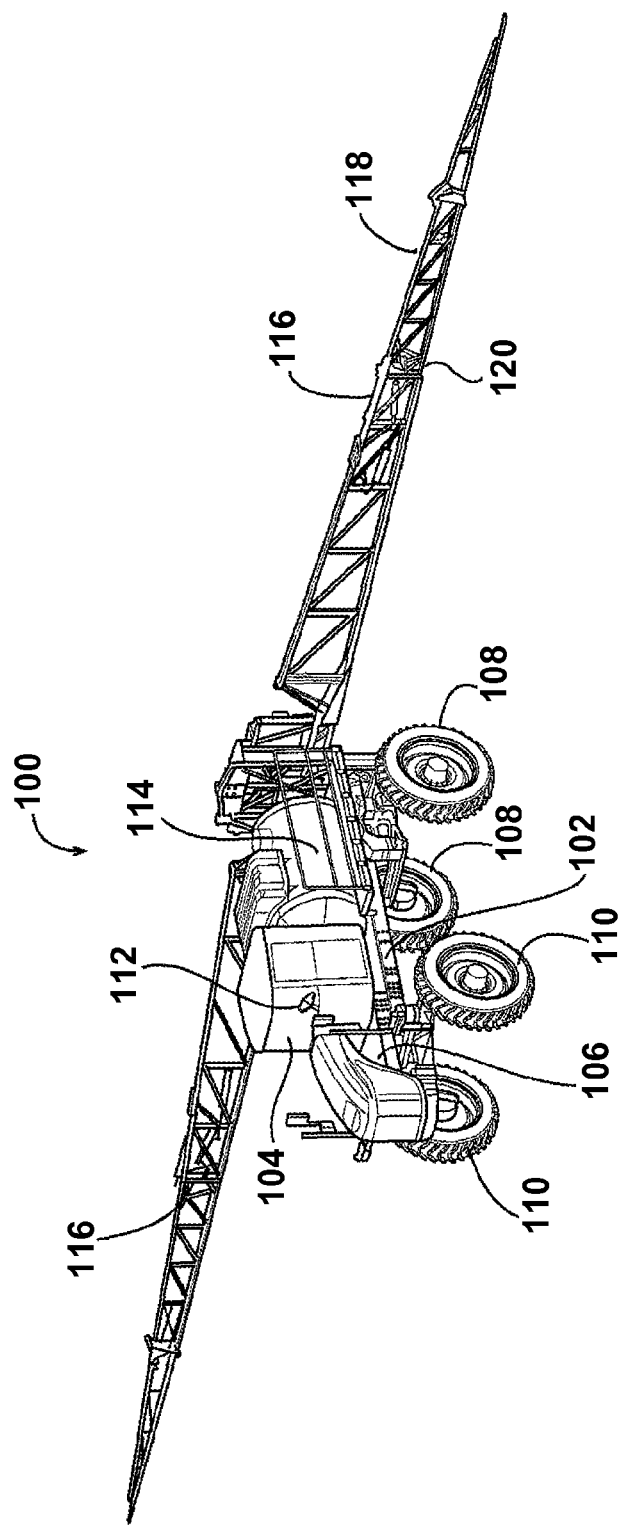
FIG. 1 shows a crop sprayer.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

A crop sprayer may comprise an agricultural vehicle or may be mounted to an agricultural vehicle. The crop sprayer may spray a fluid including herbicides, pesticides, and fertilizers on agricultural crops in a field. The fluid may be sprayed from nozzles mounted on a boom on the crop sprayer. With conventional crop sprayers, an operator may drive the crop sprayer forward in a field. As the crop sprayer moves in the field, the boom (or more specifically, a boom tip) may impact an obstacle or force may otherwise be applied to the boom. This impact or force may damage the boom or the boom tip. Consistent with embodiments of the invention, a breakaway assembly may be provided for the boom. The breakaway assembly may allow the boom, a portion of the boom, or the boom tip to break away to the rear or front of the agricultural vehicle without damaging the agricultural vehicle, the boom, or the boom tip when the boom tip impacts an obstacle or when a sufficient force is otherwise be applied to the boom tip.

FIG. 1 shows a crop sprayer 100. Crop sprayer 100 may include a frame 102. Frame 102 may be of unitary construction or may include one or more pieces secured together. Frame 102 may comprise a support frame that may span crop sprayer 100's length and may provide a structure for mounting other crop sprayer 100's components. Crop sprayer 100 may also include a cab 104 mounted on frame 102. Cab 104 may houses an operator and a number of controls for crop sprayer 100.

An engine 106 may be mounted on a forward portion of frame 102 in front of cab 104 or may be mounted on a rearward portion of frame 102 behind cab 104. Engine 106 may be commercially available from a variety of sources and may comprise, for example, a diesel engine or may be a gasoline powered internal combustion engine. Engine 106 may be used to provide energy to propel crop sprayer 100 and may provide energy used to spray fluids from crop sprayer 100.

Frame 102 may be supported by a pair of rear wheels 108 and a pair of front wheels 110. Rear wheels 108 (and/or front wheels 110) may be driven by engine 106 so as to propel crop sprayer 100. In particular, engine 106 may generate mechanical energy that may be transferred to rear wheels 108 (and/or front wheels 110) by a transmission (not shown), drive shaft (not shown), and rear (and/or front) differential (not shown). Front wheels 110 (and/or rear wheels 108) may be operable to steer crop sprayer 100.

Crop sprayer 100's propulsion and direction may be controlled by one or more operator controls that include, but are not limited to, an accelerator (not shown), a brake (not shown), and a steering wheel 112. Alternatively, crop sprayer 100's propulsion may be integrated into a control handle (not shown). For example, the operator may push the control handle forward to increase crop sprayer 100's speed and may pull back the control handle to decrease crop sprayer 100's speed.

Crop sprayer 100 may further include a storage tank 114 that may be used to store a fluid to be sprayed on a field. The fluid may include chemicals, such as but not limited to, herbicides, pesticides, or fertilizers. Storage tank 114 may be mounted on frame 102, either in front of or behind cab 104. Crop sprayer 100 may include more than one storage tank 114 to store different chemicals to be sprayed on the field. The stored chemicals may be dispersed by crop sprayer 100 one at a time or different chemicals may be mixed and dispersed together in a variety of mixtures.

Crop sprayer 100 may further include a boom 116 that may be operable to distribute the fluid over a wide swath in the field. A plurality of nozzles may be spaced along boom 116 through which the fluid may be sprayed as crop sprayer 100 is driven forward in the field to distribute the chemicals onto crops in the field. Crop sprayer 100's operator may use the control handle, located in cab 104, to control boom 116's location and the fluid dispersion through the nozzles. The operator may use the control handle to turn on the fluid flow to the plurality of nozzles and to shut off the fluid flow to the plurality of nozzles. Boom 116 may also include a boom tip 118 connected to the rest of boom 116 via a breakaway assembly 120 as will be described in greater detail below. Breakaway assembly 120 may be utilized anywhere along boom 116 as is not limited to any particular location along boom 116.

Figure 2:
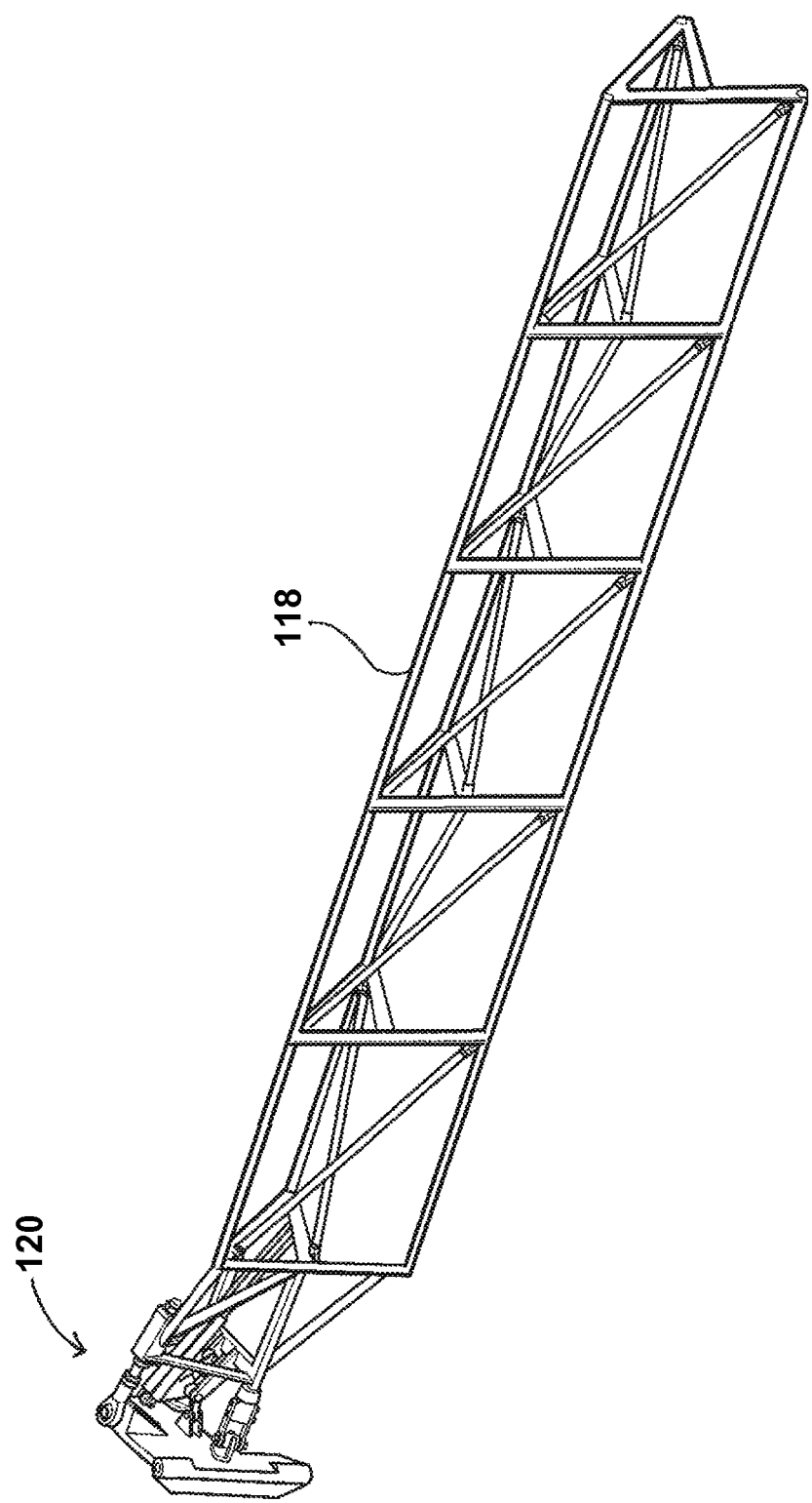
FIG. 2 shows a boom tip including and a breakaway assembly.

FIG. 2 shows boom tip 118 including breakaway assembly 120. As will be described in greater detail below, breakaway assembly 120 may allow boom tip 118 to break away to the rear or front of agricultural vehicle 100 without damaging boom 116 or boom tip 118 when boom tip 118 impacts an obstacle or when a sufficient force is otherwise be applied to boom tip 118.

Figure 3:
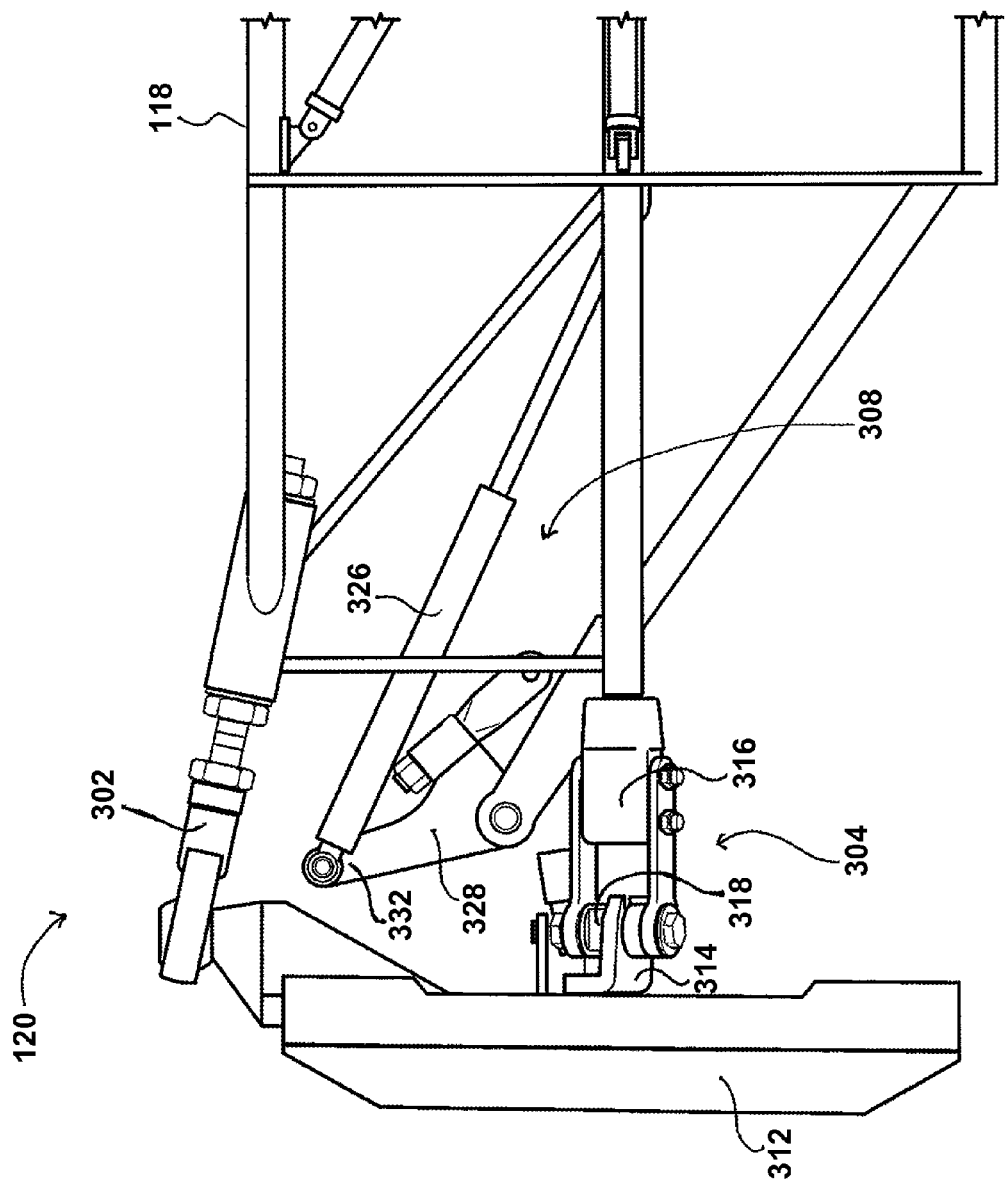
FIG. 3 shows a breakaway assembly.
Figure 4:
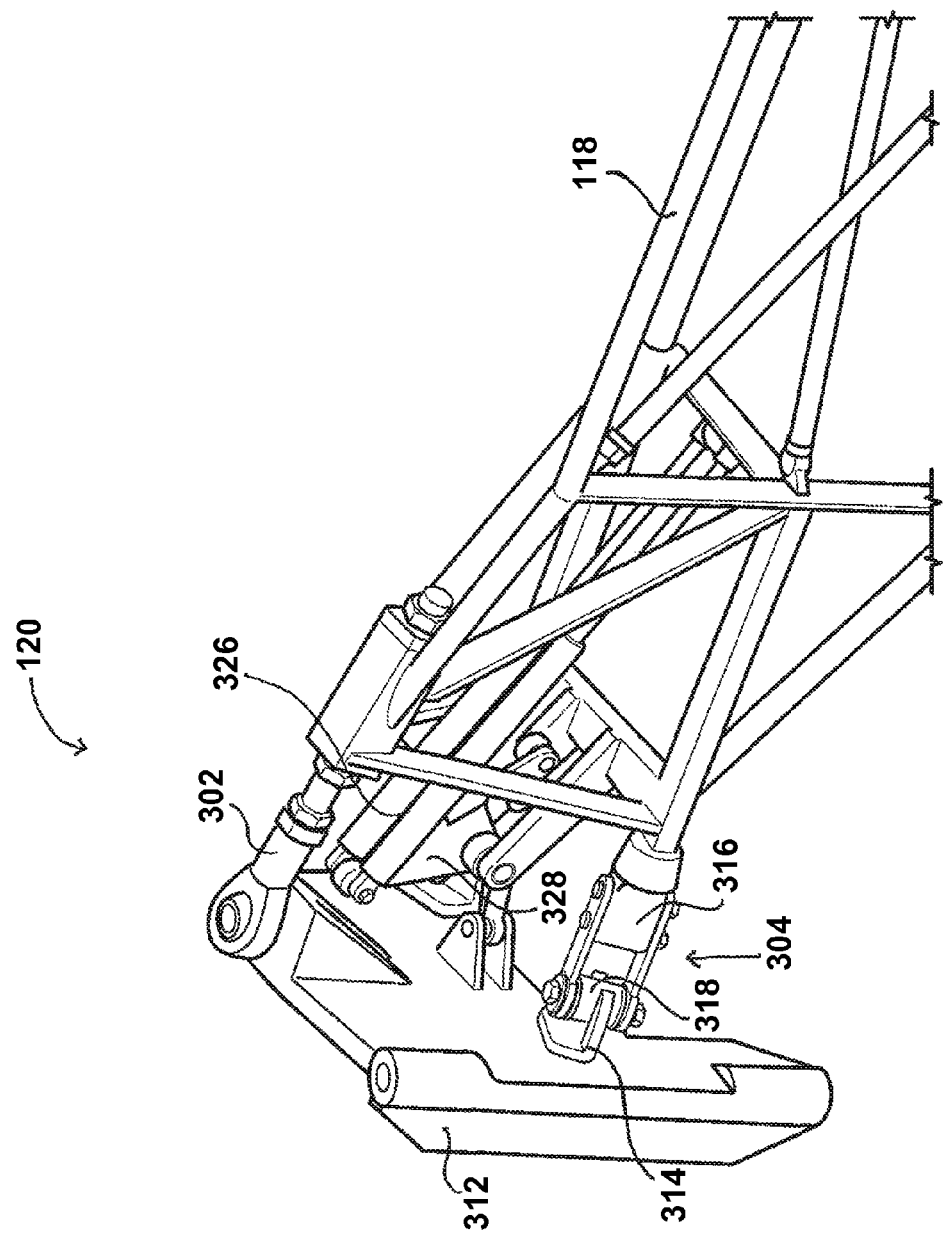
FIG. 4 shows a breakaway assembly.
Figure 5:
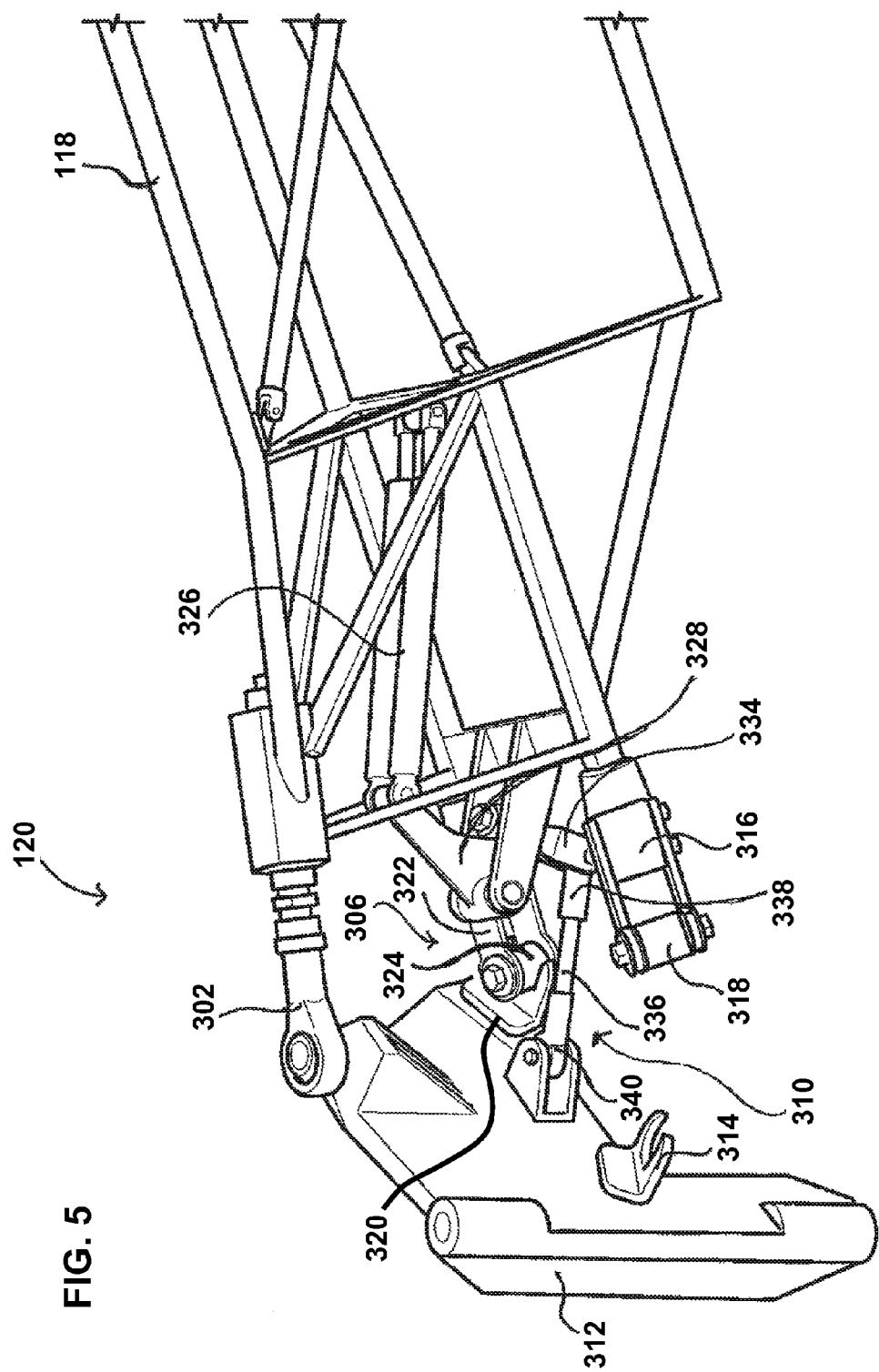
FIG. 5 shows a breakaway assembly.

FIG. 3, FIG. 4, and FIG. 5 show breakaway assembly 120 in greater detail. As shown in FIG. 3, FIG. 4, and FIG. 5, breakaway assembly 120 may comprise an upper joint 302, a first hinge 304, a second hinge 306, a pressure assembly 308, and a lower joint 310. Breakaway assembly 120 may connect to a plate 312 that may be connected to boom 116 or to crop sprayer 100. For example, upper joint 302, first hinge 304, second hinge 306, and lower joint 310 may all connect to plate 312. Upper joint 302 may comprise, for example, a ball joint. Consistent with embodiments of the invention, plate 312 may comprise any structure that can receive upper joint 302, first hinge 304, second hinge 306, and lower joint 310 and is not limited to a plate.

First hinge 304 may comprise a first seat 314 and a first hinge connector 316. First hinge connector 316 may comprise a first hinge pin 318 that may be received into first seat 314. First seat 314 may be attached to plate 312 and first hinge connector 316 may be attached to boom tip 118. Second hinge 306 may comprise a second seat 320 and a second hinge connector 322. Second hinge connector 322 may comprise a second hinge pin 324 that may be received into second seat 320. Second seat 320 may be attached to plate 312 and second hinge connector 322 may be attached to boom tip 118.

Pressure assembly 308 may comprise a spring 326, a lever arm 328, and a rotating clevis part 334. Lever arm 328 may have an upper lever arm end 332 and a lower lever arm end to which rotating clevis part 334 attaches. Rotating clevis part 334 may be able to rotate when more degrees of rotation of boom tip 118 may be needed. For example, with certain geometry of breakaway parts, forty degrees rotation may be possible without rotating clevis part 334. But with rotating clevis part 334, all the way up to or close to ninety degrees may be possible.

Lower joint 310 may comprise a rod 336 having a first rod end 338 and a second rod end 340. One end of spring 326 may be attached to upper lever arm end 332 and the other end of spring 326 may be attached to boom tip 118. Rotating clevis part 334 may be attached to first rod end 338 and second rod end 340 may attached to plate 312. Spring 326 may comprise, but is not limited to, one or more gas springs or coil springs.

Consistent with embodiments of the invention, breakaway assembly 120 may allow boom tip 118 to break away to the rear or front of agricultural vehicle 100 without damaging boom 116 or boom tip 118 when boom tip 118 impacts an obstacle or when a sufficient force is otherwise be applied to boom tip 118. For example, boom tip 118 may be in a "rest" position as shown in FIG. 3 and FIG. 4. However, when a force is applied (e.g. when boom tip 118 impacts an obstacle), boom tip 118 may leave its "rest" position and rotate into a "rotated" position as shown in FIG. 5. The maximum angle that boom tip 118 may rotate may be limited by a backstop or the maximum compressibility of spring 326.

When boom tip 118 rotates into the "rotated" position as shown in FIG. 5 in response to a force, pressure assembly 308 may be configured to create a second force opposing the force (e.g. first force) causing the rotation. In response to the force causing boom tip 118 to rotate, embodiments of the invention may transfer this force into spring 326 thus opposing the force causing boom tip 118 to rotate. For example, as boom tip 118 rotates, the force may be transfer from plate 312, through lower joint 310, causing lever arm 328 to rotate. As lever arm 328 rotates, spring 326 may compress due to the lever arm 328's rotation. Thus the force causing boom tip 118 to rotate may be transfer into spring 326. When the force causing boom tip 118 to rotate is no longer present, boom tip 118 may leave the "rotated" position as shown in FIG. 5 and may return back to its "rest" position as shown in FIG. 3 and FIG. 4. Pressure assembly 308 may also include a damper (e.g. built into spring 326) so that breakaway assembly 120 does not slam shut when boom tip 118 returns back to its "rest" position.

Consistent with embodiments of the invention, one of first hinge 304 and second hinge 306 may release in response to the first force causing boom tip 118 to rotate. Which one of first hinge 304 and second hinge 306 releases depends upon from which direction the force is coming. For example, as shown in FIG. 5 first hinge 304 may release. In this example, first seat 314 and first hinge connector 316 may separate with first seat 314 staying attached to plate 312 and first hinge connector 316 (including first hinge pin 318) rotating along with boom tip 118. At the same time second hinge 306 may rotate. For example, second hinge pin 324 may rotate within second seat 320 as boom tip 118 rotates in response the force causing boom tip 118 to rotate.

Figure 6A:
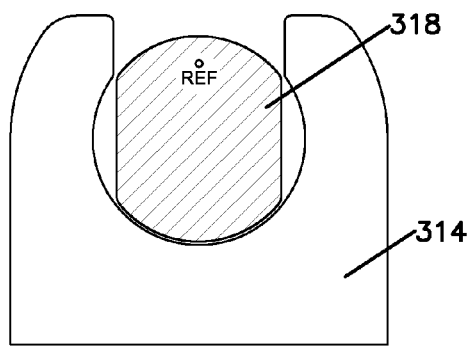
FIGS. 6A and 6B show a seat and hinge pin.
Figure 6B:
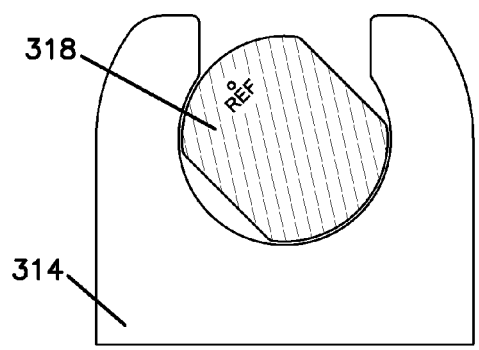

As shown in FIGS. 6A and 6B, consistent with embodiments of the invention, first hinge pin 318 and second hinge pin 324 may each be "keyed" to respectively fit into first seat 314 and second seat 320. For example, first hinge pin 318 or second hinge pin 324 may comprise a round cross-section with flat sides. First seat 314 and second seat 320 may have a rounded "U" shaped as shown in FIGS. 6A and 6B. When boom tip 118 is in the "rest" position, the flat sides of first hinge pin 318 and second hinge pin 324 may mate with the "U" shaped first seat 314 and second seat 320 as shown in FIG. 6A. Due to this keying, however, as boom tip 118 rotates into the "rotated" position, first hinge pin 318 or second hinge pin 324 may be "locked" respectively into first seat 314 or second seat 320 while boom tip 118 is in the "rotated" position as shown in FIG. 6B. This locking may keep first hinge pin 318 from bouncing out of first seat 314, for example. For example, when boom tip 118 rotates to the "rotated" position of FIG. 5, the flat sides of second hinge pin 324 may no longer mate with the "U" shaped second seat 320 thus locking second hinge 306 into place as shown in FIG. 6B. This locking may occur when boom tip 118 rotates, for instance, as little as 10 degrees into the "rotated" position from the "rest" position. The angle at which this locking may occur may be a function of a changing geometry or different tolerances and may occur at any angle. Consequently, this locking may occur with as little as 1 degree of rotation or at 5, 10, or even 25 degrees, for example.

Figure 7A:
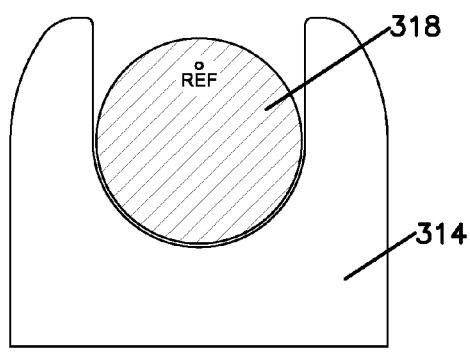
FIGS. 7A and 7B show a seat and hinge pin.
Figure 7B:
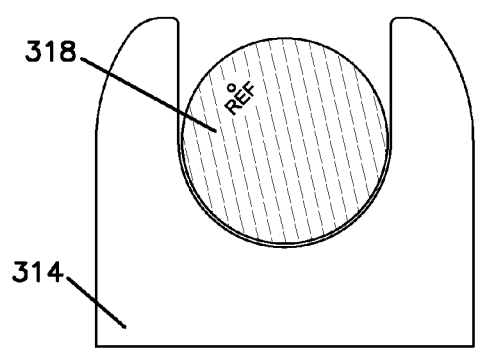

As shown in FIGS. 7A and 7B, consistent with embodiments of the invention, first hinge pin 318 and second hinge pin 324 may not be keyed to respectively fit into first seat 314 and second seat 320. Consequently, since they are not locked in this example, first hinge pin 318 may bounce out of first seat 314. Consistent with embodiments of the invention, first hinge 304 and second hinge 306 may both be configured to lock, neither may be configured to lock, or just one of the two may be configured to lock.

While certain embodiments of the invention have been described, other embodiments may exist. Further, any disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A breakaway assembly connecting an outer boom tip of a boom on an agricultural sprayer, the comprising breakaway assembly comprising:
   an upper joint connecting a boom tip to a structure;
   a first hinge connecting the boom tip to the structure, wherein the first hinge comprises a first seat and a first hinge connector, the first seat being attached to the structure and the first hinge connector being pivotable with the boom tip, wherein the first hinge connector has a generally round cross section with truncated flat portions on opposing sides and the first seat has a rounded U-shape with a rounded base having a diameter to allow the round cross section of the first hinge connector to rotate within the rounded base and an opening narrower than the rounded base that is sized to allow passage of the first hinge connector only when the truncated flat sides align with the opening such that the first hinge connector is keyed to fit into the first seat;
   a second hinge connecting the boom tip to the structure, wherein the second hinge comprises a second seat and a second hinge connector, the second seat being attached to the structure and the second hinge connector being pivotable with the boom tip, wherein the second hinge connector has a generally round cross section with truncated flat portions on opposing sides and the second seat has a rounded U-shape with a rounded base having a diameter to allow the round cross section of the second hinge connector to rotate within the rounded base and an opening narrower than the rounded base that is sized to allow passage of the second hinge connector only when the truncated flat sides align with the opening such that the second hinge connector is keyed to fit into the second seat;
   a pressure assembly connected to the boom tip; and
   a lower joint connecting the pressure assembly to the structure;
   wherein when a force is applied to the boom tip to cause the boom tip to rotate with respect to the structure about the upper joint:
      the pressure assembly is configured to oppose rotating of the boom tip about the upper joint; and
      one of said first and second hinges is configured to release in response to the boom tip rotating due to the force, said release comprising separation of the hinge connector from the seat in the released hinge, and wherein the other of said first and second hinges does not release such that the connector pivots within the seat of the other of the first and the second hinges to a locked orientation where the truncated sides are misaligned with the seat opening such that the locked connector is prevented from releasing from the seat.

2. The breakaway assembly of claim 1, wherein the first hinge connector comprises a first hinge pin.

3. The breakaway assembly of claim 1, wherein the second hinge connector comprises a second hinge pin.

4. The breakaway assembly of claim 1, wherein the pressure assembly comprises a lever arm and a spring.

5. The breakaway assembly of claim 4, wherein the spring comprises a gas spring.

6. The breakaway assembly of claim 4, wherein the spring includes a damper.

7. The breakaway assembly of claim 1, wherein the lower joint comprises a rotating clevis part connecting the structure to the pressure assembly.

8. The breakaway assembly of claim 1, wherein the lower joint comprises a rod connecting the structure to the pressure assembly.

9. The breakaway assembly of claim 1, wherein the structure is attached to a boom.

10. The breakaway assembly of claim 1, wherein the structure is attached to an agricultural vehicle.

11. The breakaway assembly of claim 1, wherein the upper joint comprises a ball joint.

12. The breakaway assembly of claim 1, wherein a maximum angle that the boom tip may rotate is limited by a backstop.

13. The breakaway assembly of claim 1, wherein a maximum angle that the boom tip may rotate is limited by a maximum compressibility of a spring disposed in the pressure assembly.

* * * * *